Patented May 13, 1947

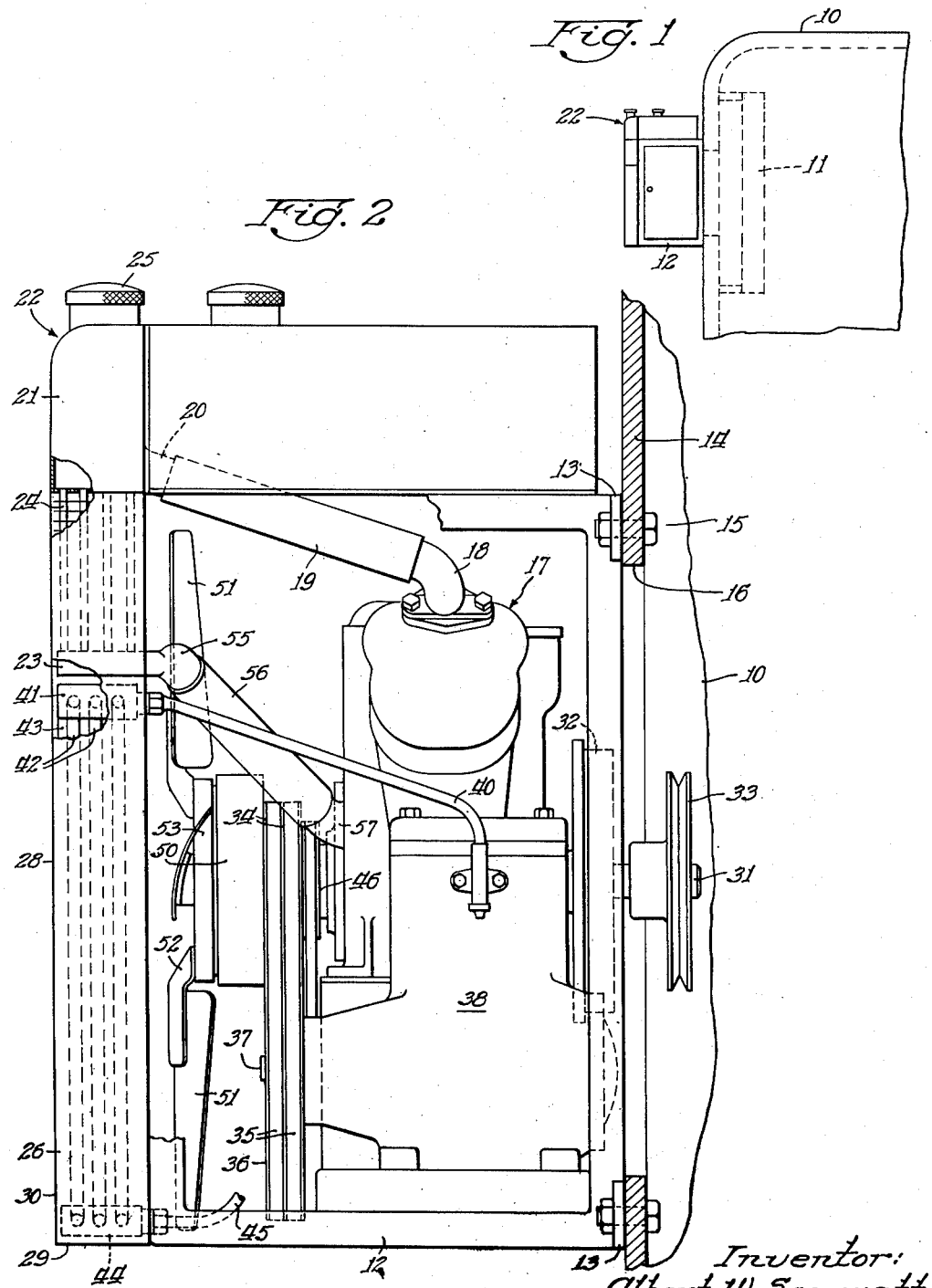

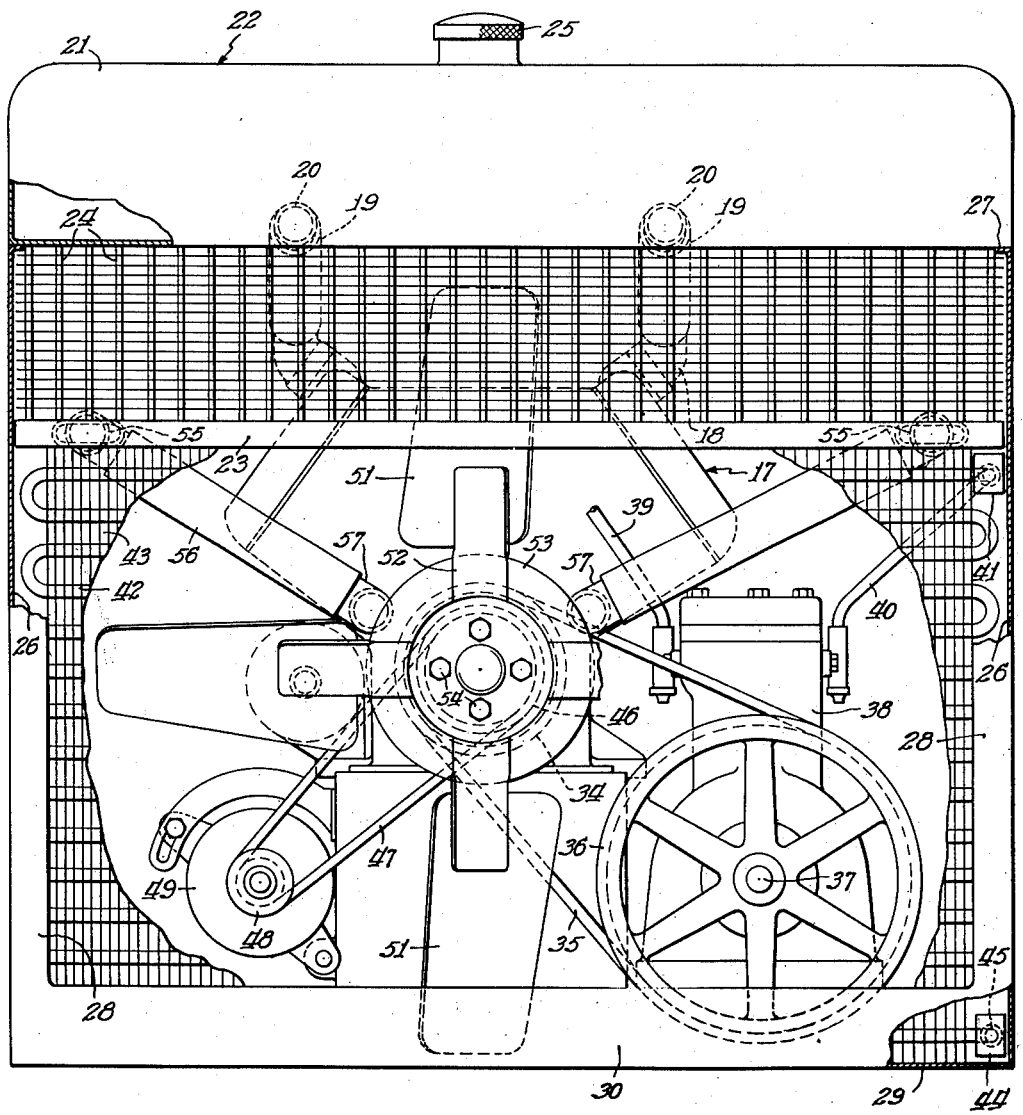

2,420,566

UNITED STATES PATENT OFFICE 2,420,566

ENGINE DRIVEN REFRIGERATION UNIT

Albert W. Scarratt, Kenilworth, Ill., assignor to International Harvester Company, a corporation of New Jersey Application May 7, 1945, Serial No. 592,338

4 Claims. (Cl. 62—115)

This invention relates to a gasoline engine driven compressor unit particularly adapted for installation for such uses as truck refrigeration. More specifically the invention relates to a water cooled engine driven compressor in which the cooling radiator and the refrigerant compressor are cooperatively arranged. In the development of refrigeration units of small sizes using gasoline engines considerable difficulty has been encountered with air cooled engines due to the inability of such engines to carry compressor loads over a wide engine speed and over considerable load variation on the compressor.

A principal object of the present invention is to provide a simplified compact and efficient gasoline engine driven compressor unit of a small capacity and of small over-all dimensions.

Another principal object is to arrange a compressor condenser and a radiator for a water cooled engine so they may be efficiently cooled by a single fan directly mounted on the engine crank-shaft.

These objects and others which will be apparent from the detailed description to follow are accomplished by a structure such as shown in the drawings, in which:

Figure 1 is a small diagrammatic view showing a refrigeration unit mounted at the front end of a truck trailer;

Figure 2 is a side elevation showing the side cover plate removed from the unit shown in Figure 1 to better show the interior construction and with certain portions broken away in section to better illustrate the radiator and condenser construction; and Figure 3 is a front view with a large portion of the condenser core broken away in order to obtain a front view of the engine and compressor and the associated parts.

In the drawings, a portion of a truck trailer 10 is illustrated in Figure 1 to show a typical installation of a gasoline engine driven refrigeration unit utilizing the structure of this invention. The heat rejecting parts of the refrigeration unit are mounted outside of the trailer body and an evaporator 11 indicated by dotted lines in Figure 1 is mounted within the trailer body. The outside portion of the unit is mounted on a frame structure including rectangular end frames 12, which form a principal part of the frame structure, to which the other elements are connected or on which they are mounted. Laterally projecting ears 13 are indicated on one of the end frames 12 to illustrate means by which said frames and the structure supported thereby may be supported on an end wall 14 of the trailer body 10. Bolts 15 are indicated as illustrative of securing elements. An opening 16 in the end wall 14 provides for projecting the certain parts through the end wall into the trailer body.

A gasoline engine indicated in its entirety by the reference character 17 is mounted between the end frames 12 and by other suitable means not shown. Said engine is of the V-type having two cylinders projecting upwardly and outwardly. Each of the cylinders is provided with a water outlet fitting 18 extending forwardly and upwardly for connection with a hose 19. The hose 19 are connected to fittings 20 extending rearwardly and downwardly from an upper radiator header 21. Said header is a portion of a conventional type of radiator structure indicated in its entirety by the reference character 22. The radiator differs from most radiators in that its vertical height is very small as compared to its lateral dimension. This structure is provided for a particular reason as will be apparent in the description of the other parts of the heat rejecting system.

The radiator 22 is provided with a lower header 23 between which finned vertical tubes 24 extend. A filler cap 25 is also provided for said radiator.

As a part of the frame structure, vertically extending end walls 26 extend along the ends of the core of the radiator 22 having inturned flanges 27 at their upper ends, said flanges extending under the bottom of the header 21. Front flanges 28 are formed integrally with the end walls 26 overlapping a portion of the ends of the radiator core and the bottom header 23. Said end walls are also integrally connected to a bottom wall 29 which has an upwardly turned front flange 30.

The engine 17 has a conventional crank-shaft, said shaft projecting both forwardly and rearwardly. The rearward end 31 of the crank-shaft carries a fly-wheel 32 and a V-belt pulley 33 which is mounted within the trailer body 10 in a position for driving fans for circulating air over the evaporator 11.

The front end of the crank-shaft carries a pair of V-pulleys 34 which are connected by a pair of belts 35 with a multiple groove pulley 36 mounted on a shaft 37 which is the crank-shaft of a conventional reciprocating compressor 38. Said compressor is mounted offside of the engine by suitable means not illustrated on the frame structure of the unit.

A conduit 39 is shown which brings expended refrigerant from the evaporator 11 to the compressor. A discharge conduit 40 is shown which delivers compressed refrigerant from the compressor to a small header 41 from which the refrigerant is delivered through three horizontally arranged zig-zag condenser coils 42. Said condenser coils cover a substantial portion of the frontal area of the complete unit extending from the bottom to the lower header 23 of the cooling radiator. This is approximately three-fourths of the total frontal area. Closely spaced vertical fins 43 are connected to the coils 42 to increase the heat radiating capacity.

The outlet ends of the condenser coils 42 are connected to a small header 44 positioned at the bottom of the condenser. Said header is connected with a conduit 45 which is adapted to deliver condensed refrigerant to the evaporator 11.

In addition to the pulleys 34, the front end of the engine crank-shaft carries a V-pulley 46 which is connected by a V-belt 47 with a pulley 48 mounted on a generator 49.

The front end of the engine crank-shaft also carries a cylindrical structure 50 which, in addition to acting as a fly-wheel, provides means for supporting an air circulating fan having four blades 51 connected by brackets 52 with a circular center structure 53 which is in turn secured by capscrews 54 to the member 50. Said fan is of an outside diameter sufficiently large to cover substantially the entire frontal area of the unit including the condenser as formed by the coils 42 and the radiator 22.

In a device as above described, cooling of the engine does not require as much heat dissipation as cooling and condensing the compressed refrigerant. This is quite obvious as all of the power of the engine not rejected in its own cooling system is converted into heat by the compressor and must therefore be dissipated by the condenser. For that reason the condenser occupies a major portion of the cooling area provided by circulation brought about by the fan while the engine radiator occupies only a small portion of the area through which air is circulated by the fan.

Moreover the location of the radiator 22 is particularly advantageous as it is in a position to attain a maximum thermosiphon circulation of cooling liquid through the engine cylinders to the engine block and to the radiator. The lower header 23 is provided with a pair of fittings 55 to which hose 56 are connected for delivering cooled liquid from the radiator to fittings 57 which are provided on the engine. The downward disposition of the hose 56 in addition to providing for a maximum height of the condenser are effective in setting up a better arrangement for thermosiphon circulation of cooling liquid through the engine and its associated radiator.

The operation of applicant's improved engine and compressor unit has been described in connection with the detailed description of the parts. It is understood that applicant claims as his invention all modifications falling within the scope of the appended claims.

What is claimed is:

1. A refrigeration unit comprising a frame structure, a water-cooled engine and a compressor mounted on said frame structure, drive means between said engine and said compressor, and a heat radiating structure mounted across the front of the frame structure, said heat radiating structure including a lower section formed as a condenser for refrigerant, fluid conduit means between said condenser and said compressor, and an upper section formed as a radiator for the engine, said radiator being connected to the engine by inlet and outlet conduits.

2. A refrigeration unit comprising a frame structure, a water-cooled engine and a compressor mounted on said frame structure, drive means between said engine and said compressor, a heat radiating structure mounted across the front of the frame structure, said heat radiating structure including a lower section formed as a condenser for refrigerant, fluid conduit means between said condenser and said compressor, and an upper section formed as a radiator for the engine, said radiator being connected to the engine by inlet and outlet conduits, and an air circulating fan back of the heat radiating structure and overlapping both sections thereof for causing air flow through the entire heat radiating structure.

3. A refrigeration unit comprising a frame structure, a V-type water-cooled engine mounted on said frame structure, a compressor mounted adjacent said engine, a belt drive between said engine and said compressor, a heat radiating structure mounted across the front of the frame structure, said heat radiating structure including one section formed as a condenser for refrigerant occupying the lower portion of the heat exchange device and a substantial part of the upper portion thereof, fluid conduit means between said condenser and said compressor, and a second section formed as a radiator for the engine comprising the upper portion of said heat radiating device, said radiator having a header at the top portion thereof connected to the engine by a pair of inlet conduits, a fan back of the heat radiating structure and overlapping both sections thereof for causing air flow through the entire radiating structure.

4. A refrigeration unit comprising a frame structure, a water-cooled engine mounted on said frame structure, a compressor mounted adjacent said engine, drive means between said engine and said compressor, a heat radiating structure mounted across the front of the frame structure, said heat radiating structure including a condenser for refrigerant occupying the lower portion of the heat exchange device and a substantial part of the upper portion thereof, fluid conduit means between said condenser and said compressor, and a radiator for the engine comprising the upper portion of said heat radiating device, said radiator being connected to the engine by inlet and outlet conduits, the crank-shaft of said engine projecting forwardly approximately at the center of the heat radiating structure, and a single fan mounted on said crank-shaft for causing air flow through the entire radiating structure.

ALBERT W. SCARRATT.

REFERENCES CITED

The following references are of record in the file of this patent:

UNITED STATES PATENTS

| Number | Name | Date |
|---|---|---|
| 2,017,579 | Anderson | Oct. 15, 1935 |
| 2,320,596 | Henney | June 1, 1943 |